(12) United States Patent
Collins et al.

(10) Patent No.: US 7,055,029 B2
(45) Date of Patent: May 30, 2006

(54) CRYPTOGRAPHIC SYSTEM ENABLING OWNERSHIP OF A SECURE PROCESS

(75) Inventors: Thomas Collins, Saratoga, CA (US); John Gregory, Livermore, CA (US); Ralph Bestock, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 889 days.

(21) Appl. No.: 09/949,323

(22) Filed: Sep. 7, 2001

(65) Prior Publication Data

US 2002/0073316 A1    Jun. 13, 2002

Related U.S. Application Data

(63) Continuation-in-part of application No. 09/017,759, filed on Feb. 3, 1998.

(51) Int. Cl.
*H04L 9/00* (2006.01)

(52) U.S. Cl. ............... 713/161; 713/176; 713/193; 380/262

(58) Field of Classification Search ............... 713/161, 713/168, 172, 176, 181, 184, 192–194; 380/44, 380/46, 262; 705/57–59
See application file for complete search history.

(56) References Cited

U.S. PATENT DOCUMENTS

| | | | | | |
|---|---|---|---|---|---|
| 4,926,478 | A | * | 5/1990 | Gruenberg | 705/75 |
| 4,995,082 | A | * | 2/1991 | Schnorr | 713/169 |
| 5,343,527 | A | * | 8/1994 | Moore | 713/179 |
| 5,835,594 | A | * | 11/1998 | Albrecht et al. | 713/187 |

* cited by examiner

*Primary Examiner*—Hosuk Song

(57) ABSTRACT

Ownership of a secure process is enabled with a cryptographic system. Methods initializing and operating the cryptographic system transfer control from the loading program to the loaded program and, in essence from the cryptographic system vendor to its end-user. As a result, ownership of the secure process can be relinquished to the end-user so that it alone can subsequently use the cryptographic system to control the secure process of loading and running its user-programs. The cryptographic system and methods allow for secure operations and protect against tampering with application software. The application program is retrieved from an encrypted file in external memory and authenticated by the cryptographic system before being executed.

56 Claims, 5 Drawing Sheets

CRYPTOGRAPHIC SYSTEM ENABLING OWNERSHIP OF A SECURE PROCESS

REFERENCE TO PRIOR APPLICATION

This application is a continuation in part (CIP) of and incorporates by reference U.S. application Ser. No. 09/017,759 filed Feb. 3, 1998, and titled "Cryptographic System".

BACKGROUND OF THE INVENTION

This invention relates generally to communicating data securely, and more particularly to a cryptographic system and methods of using public key cryptography.

Computer systems are found today in virtually every walk of life for storing, maintaining, and transferring various types of data. The integrity of large portions of this data, especially that portion relating to financial transactions, is vital to the health and survival of many commercial enterprises. Individual consumers also have an increasing stake in data security as open and unsecure data communications channels for sales transactions, such as credit card transactions over the Internet, gain popularity.

Protecting data stored in computer memory, tape, and disk is often important. However, just as important, if not more so, is the ability to transfer financial transactions or other communications from a sender to an intended receiver without intermediate parties being able to interpret the transferred message. Furthermore, as important transactions are increasingly handled electronically, authentication of the originator of a message must be ensured. For example, for electronic banking, there needs to be a way to authenticate that an electronic document, such as a bank draft, has actually been "signed" by the indicated signatory.

Cryptography, especially public key cryptography, has proven to be an effective and convenient technique of enhancing data privacy and authentication. Data to be secured, called plaintext, is transformed into encrypted data, or ciphertext by a predetermined encryption process of one type or another. The reverse process, transforming ciphertext into plaintext, is termed decryption. In public key cryptography, the processes of encryption and decryption are controlled by a pair of related cryptographic keys. A "public" key is used for the encryption process, and a "private" key is used to decrypt ciphertext. Alternatively, the private key may be used to encrypt the data, and the public key to decrypt it. This latter method provides a method of digitally signing data to positively identify the source of the data.

The prior art includes a number of public key schemes. However, over the past decade, one system of public key cryptography has gained popularity. Known generally as the "RSA" scheme, it is now thought by many to be a worldwide defacto standard for public key cryptography. The RSA scheme is described in U.S. Pat. No. 4,405,829.

The RSA scheme capitalizes on the relative ease of creating a composite number from the product of two prime numbers whereas the attempt to factor the composite number into its constituent primes is difficult. Pairs of public/private keys can then be found based on the factors of the composite number. A message is encrypted using a series of mathematical exponentiations and divisions based on one of the keys. If the matching key of the public/private key pair is known, the message can be decrypted using a series of mathematical exponentiations and divisions using the matching key. The composite number is a part of the public and private keys and is known to the public. However, since the private key can only be found by factoring the composite number, calculating the private key from the public key is computationally difficult.

The security of the RSA technique can be enhanced by increasing the difficulty of factoring the composite number through judicious choices of the prime numbers. (This, of course, would be true for any encryption/decryption scheme using or requiring prime numbers.) Another, and principle enhancement, is to increase the length (i.e., size) of the composite number. Today, it is common to find RSA schemes being proposed in which the composite number is on the order of 600 digits long. The task of exponentiating a number this long, however, can be daunting and time consuming, although not as difficult as factoring. Therefore, increasing the length of the composite number increases the security, but only at the expense of increased time to perform the encryption and decryption.

However, recently discovered techniques have greatly improved the efficiency with which encryption/decryption functions are performed using the RSA scheme. Rather than using two prime numbers to form the composite number conventionally employed in RSA cryptographic operations, it has been found that more than two prime numbers can also be used. In addition, it has also been found that the Chinese Remainder Theorem can be used to break an RSA encryption or decryption task into smaller parts that can be performed much faster than before.

The Chinese Remainder Theorem allows the necessary computations to be divided into two exponentiations. Commonly assigned U.S. Pat. No. 5,848,159, filed Jan. 16, 1997, which is incorporated by reference for all purposes, discloses a method of using multiple prime numbers to create the composite number and further dividing the exponentiations into multiple smaller exponentiations. However, though the encrypting and decrypting exponentiations are smaller and therefore accomplished more quickly, the factorization of the composite number is no easier to compute. So, the security of the system is not compromised.

In addition to the security of the data, another important issue with regard to cryptographic systems is the security of the system itself and processes handled thereby. In a system implementing an encryption algorithm, ensuring that the system is secure from tampering is important. One area of concern is the secure loading and storing of application programs for the system. If the application program can be altered or substituted, the security of a system may be breached.

It is therefore desirable to provide an efficient cryptographic system for implementing public key cryptography with multiple prime factors. It is also desirable to provide a cryptographic system that may be initialized to a secure state and can provide security and maximum flexibility for user application programs.

SUMMARY OF THE INVENTION

A cryptographic system is provided having a processor and a plurality of exponentiation units. The processor receives encryption or decryption requests from a host processor and divides them into one or more exponentiation tasks. These exponentiation tasks are transferred to one or more execution units that perform the exponentiation and return a value to the processor. This allows the exponentiations tasks to be performed in parallel, thereby decreasing the time needed to perform the encryption and decryption requests.

The present invention further provides a method of initializing the cryptographic system in a secure manner and enabling ownership of secure processes, such as user ownership or vendor ownership. The manufacturer (or vendor) signs the first program file, and the user signs the second program file. The first program file is configured to include the public key component of the user's private key that signs the second program file. Thus, the manufacturer can control which applications can be executed by the host of the cryptographic system (e.g., first program file) and the user (through the first program file) can control whether and which program file (e.g. second program file) can be loaded and executed.

An external memory holds a first program file along with header information, a hash value, and a digital signature in an encrypted program packet. The first program file contains a key/option table holding an RSA cryptographic public key. A processor loads the encrypted program packet and decrypts it using a cryptographic key. However, the processor executes the decrypted program file only after the processor authenticates it. If the decrypted program file cannot be authenticated, then the cryptographic (DES) keys are zeroed out, and the cryptographic system is put into a non-functioning state.

The first program file is authenticated by checking the header for proper format, computing an expected hash value of the first program file and comparing it with the hash value, and checking the digital signature with an RSA public key that is stored in the cryptographic system. The RSA public key counterpart, the RSA private key known only to the manufacturer, is used in signing the hash value to create the digital signature. In essence, ownership of the secure process starts at the manufacturer the role of which, in this regard, is akin to a certificate authority.

After authenticating the first program file, the processor executes the first program file. The first program file loads a second program file from the external memory. This second program file is generally a user-application program. It is authenticated in a similar manner to the first program file, but the digital signature is checked against the RSA public key found in the key/option table. In essence, ownership of the secure process is relinquished by the manufacturer, which does not have the user's RSA private/public key pair, and is transferred from the manufacturer to the end user.

Namely, by this initialization process, the user of the cryptographic system may load personalized application programs with secret cryptographic keys not known to anyone else. The process ensures that the application programs cannot be altered or substituted with fraudulent programs. At the same time, the manufacturer of the cryptographic system can securely provide maintenance and upgrade programs over public networks, and ensure that only properly licensed users are using the programs.

A further understanding of the nature and advantages of the inventions presented herein may be realized by reference to the remaining portions of the specification and the attached claims.

DETAILED DESCRIPTION OF THE INVENTION

Figure 1:
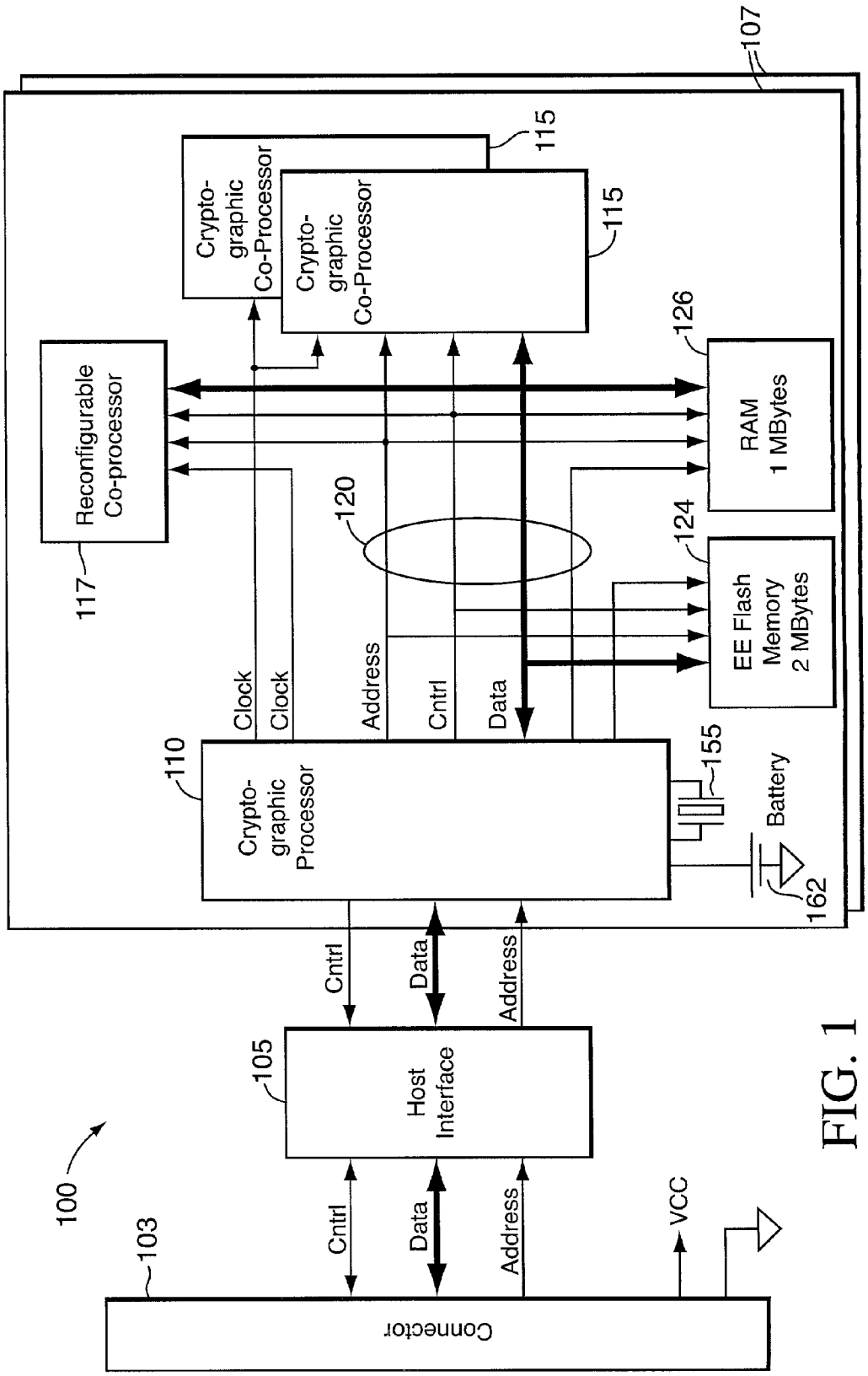
FIG. 1 shows, in block diagram form, a cryptographic system.

Turning now to the figures, and for the moment, FIG. 1, there is illustrated a cryptographic system 100 constructed according to the teachings of the present invention to implement RSA public key cryptography—although, as will be evident to those skilled in this art, other cryptographic schemes may be used. In operation, data is brought into cryptographic system 100 from an external source (not shown) such as a host computer, a network, or other source. The external source is connected to cryptographic system 100 through a connector 103. Cryptographic system 100 operates to receive data and instruction from the external source or host, to encrypt or decrypt the data, and return it to the host.

Preferably, the communicating medium connecting the host (not shown) and the cryptographic system 100 is a peripheral component interconnect (PCI) bus because, among other things, of its processor independence. However, it will be evident to those skilled in this art that other bus structures may be used, and even preferred given different host environments.

The connector 103 is coupled to a pair of processing boards 107 by a host interface 105. The processing boards 107 are each substantially identical in design and construction, so that a description of one will apply equally to the other. Each processing board 107 is separately addressable and may operate in parallel with the other.

As FIG. 1 shows, the processing boards 107 include a cryptographic processor 110 that operates, in response to the instructions from the host (not shown), to perform encryption or decryption. To accelerate the exponentiation tasks requested of the cryptographic processor 110, one or more cryptographic co-processors 115 and a reconfigurable co-processor 117 are provided. The cryptographic co-processors 115 are specially constructed to perform, quickly, the various exponentiations necessary to most cryptographic tasks. The cryptographic co-processors 115 are described in greater detail below in connection with FIG. 3.

Data is transferred between cryptographic processor 110 and cryptographic coprocessor(s) 115, and reconfigurable coprocessor 117 by a secure bus 120. Secure bus 120 carries address, control and data lines—as well as any chip select lines that may be used. To preserve the security of the cryptographic system 100, all information of a secure nature is encrypted before being placed on secure bus 120. In the specific embodiment, a DES engine, capable of DES encryption and decryption, is included in cryptographic processor 110, cryptographic coprocessor(s) 115, and reconfigurable coprocessor 117 for providing the encryption and description for secure bus 120. Of course, other types of security, other than DES may be provided, depending upon how much security is required and the resources available to provide the security.

Although the cryptographic processor 110, as will be seen, is constructed to include memory, additional memory, external to the cryptographic processor 110, is provided in the form of a flash memory 124 and a random access memory (RAM) 126. Data is transferable to flash memory 124 and a random access memory (RAM) 126 by way of secure bus 120. In the specific embodiment, flash memory 124 has two megabytes of storage capacity. Its primary use in the specific embodiment is as a repository for a user-application program. A user-application program is encrypted and stored in flash memory 124 along with information to protect it from unknown alteration. After the system is successfully booted and the user-application program loaded into cryptographic processor 110, tests are done to ensure its authenticity before control of the system is transferred to the user-application program. Details of an exemplary method of securely booting the system and loading an application program are presented below with respect to FIGS. 4 and 6.

The RAM 126 is used for the storage of both secure and unsecure data. In the specific embodiment, it is one megabyte of volatile memory.

Cryptographic processor 110 is provided with the output of crystal oscillator 155 from which it generates clock signals for its own use and for use by other components of cryptographic system 100. A battery 162 is also optionally provided to supply backup power during a power failure. Its use is not required by the present invention.

As mentioned above, the cryptographic system can be a board-level product. The board-level cryptographic system can be based on a cryptographic processor 110 such as the VMS310—NetArmor™ Encryption Processor available from VLSI Technology, Inc., in San Jose, Calif. The cryptographic system may include one or more such devices.

Figure 2:
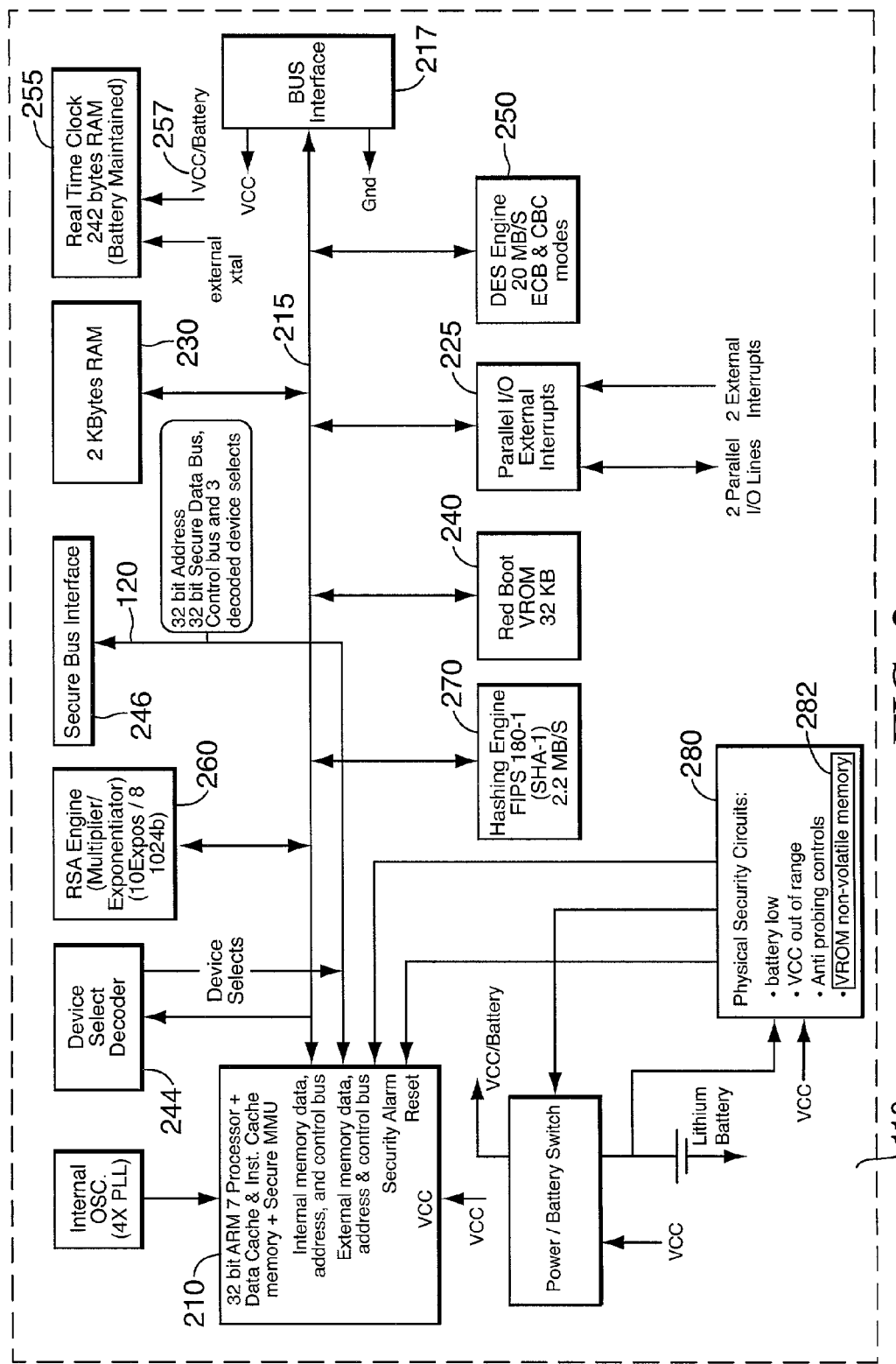
FIG. 2 illustrates the cryptographic processor forming a part of the cryptographic system of FIG. 1.

FIG. 2 depicts a more detailed description of cryptographic processor 110. Preferably, cryptographic processor 110 is physically secure from inspection and tampering by outside sources. In the specific embodiment, it meets the Federal Information Protection System (FIPS) level 3 standard.

As FIG. 2 shows, the cryptographic processor 110 includes a central processor unit (CPU) 210 as the main controller of the system. CPU 210 executes initialization sequences and user-application programs. It receives data and instructions from the external host and breaks the instructions down into tasks as required or necessitated by the user-application program. It assigns some of the tasks to other specialized units (e.g., the one or more cryptographic co-processors 115) as will be described below. In the specific embodiment, CPU 210 is a 32-bit Advanced RISC Machine (ARM) 7 processor. This is a RISC-based processor constructed for pipeline operation. However, many different processors will be appropriate for use in a similar system.

CPU 210 is coupled with other elements within cryptographic processor 110 by means of a data/address bus 215. Data/address bus 215 is also coupled to host interface 105 through a bus interface 217. Bus interface 217 provides a path to host interface 105, while keeping data/address bus 215 secure from unwanted monitoring. Encryption and decryption requests are delivered to CPU 210 over data/address bus 215 through bus interface 217, and the results are returned by the same path. In the specific embodiment, data/address bus 215 is a 32-bit data bus with control and address signals. Data on data/address bus 215 is not necessarily encrypted, but is kept secure from tampering with physical security that is built into the chip that prevents probing of the chip.

During its operation, CPU 210 may have its operation interrupted by certain events. An interrupt circuit 225 is provided for sensing an interrupt event and communicating the event to CPU 210. This is a common practice and a design for interrupt circuit 225 will be readily apparent to one of skill in the art.

As FIG. 2 shows, the cryptographic processor 110 incorporates various support devices, including random access memory and read-only (RAM 230 and VROM 240), an encryption/decryption engine (DES engine 250) for encrypting and decrypting information communicated on the secure bus 120, an RSA engine (multiplier/exponentiator circuit) 260, and hashing engine 270. These components are all connected to CPU 210 via data/address bus 215.

The random access memory (RAM) 230 is typically provided for use by CPU 210 as a temporary data storage. In this embodiment, it is a two-kilobyte RAM with a 32-bit data input. It may be used for storing a user-application program upon which CPU 210 operates and as a scratchpad memory for temporary storage of data and variables. It is coupled to CPU 210 by data bus 215.

VROM 240 is what is known as a volatile ROM or VROM; it is a read-only memory that is physically secure from tampering or probing. A purpose of VROM 240 is as a repository for startup software, which is installed in the factory and may not be altered. As shown in FIG. 2, the VROM 240 holds the red-boot program. The startup (including red-boot) software in VROM 240 is the controlling software that is executed automatically by CPU 210 upon reset (and when power is applied to the system). The red-boot program enables other programs to execute by passing control thereto. The red-boot program transfers control to a program stored in the flash memory after it authenticates the application program. Without receiving such control, the other programs will not be able to execute. Namely, the red-boot program will refuse loading and executing a program that is not authenticated. The red-boot program functions to provide two types of security protection, protection for secure instructions execution and for secret cryptographic keys used by these instructions. This allows the manufacturer of the cryptographic system to control which applications can be authorized to run by the red-boot program. To this end, this also allows the cryptographic system to initialize itself and to operate securely. Additional details of the startup software will be provided with respect to FIG. 4 below.

A device select decoder 244 operates to decode certain address ranges and provides signals to select certain external devices. Though not a necessary element of the present invention, device select decoder 244 reduces the amount of logic needed on external devices to decode addresses and to add flexibility to external devices. In the specific embodiment, device select lines are used to enable individual cryptographic coprocessors 115.

In the specific embodiment, secure bus 120 (FIG. 1) is connected to a secure memory management unit (MMU) forming a part of the CPU 210. Of course, if another device is used as CPU 210 that does not have a secure MMU, additional circuitry outside CPU 210 may be used to provide secure bus 120. However, the MMU of CPU 210 operates to effectively shield the internal data bus 215 from external probing, thereby securing internal information of the cryptographic processor 110 from surreptitious inquiry. The cryptographic processor 110 connects to secure bus 120 by a secure bus interface 246. Secure bus interface 246 provides the driver and receiver circuits for the signal lines that make up the secure bus 120.

Before being placed on secure bus 120, data is first encrypted to make it secure by the DES bus encryption engine 250, using Data Encryption Standard, an American National Standards Institute (ANSI) approved standard for data encryption (ANSI X3.92). The DES engine 250 is configured to operate at 20 Mbytes per second and will operate in either ECB or CBC modes. Details of the DES protocol are well known in the art of cryptography and may be found, for example, in U.S. National Bureau of Standard, "Data Encryption Standard," Federal Processing Standard (FIPS) Publication 46, January 1977. However, the present invention is not limited to DES protocol for secure bus 120. Other encryption algorithms, now known or yet to be developed, may also be used to make secure bus 120 secure.

Figure 4:
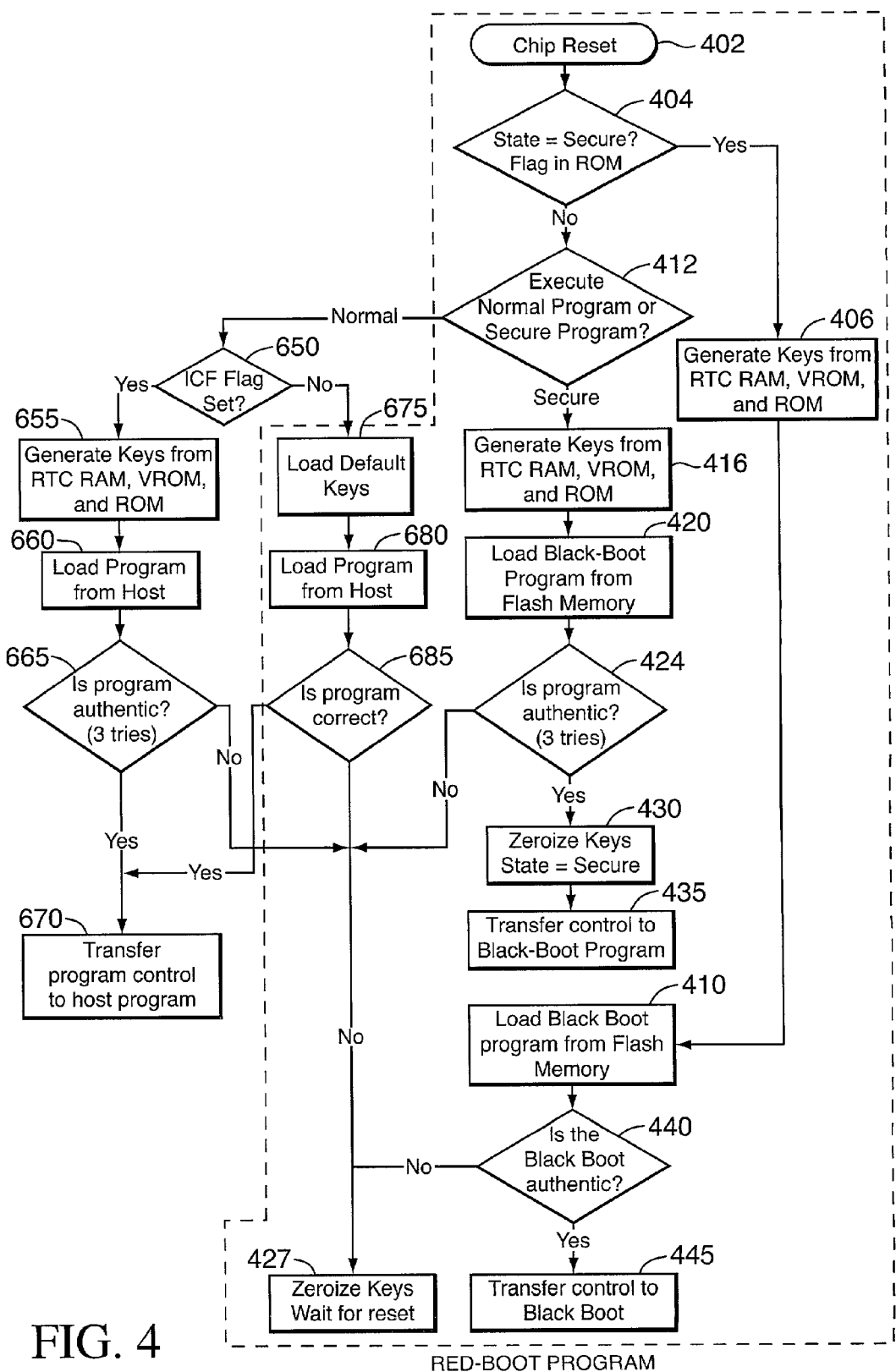
FIG. 4 is a flow diagram of a secure startup program used to initialize the cryptographic system of FIG. 1.

The keys for DES encryptions performed by the DES engine 250 are generated randomly and stored by CPU 210 (e.g., as shown in FIG. 4 steps 406, 416 and 655). To that end, a seed for generating the DES keys is stored in the VROM 282 (within the physical security circuit 280 in FIG. 2), and additional seeds can be stored in and provided from the VROM 240 and RTC RAM 255.

In the specific embodiment, the generated DES keys are stored in real time clock (RTC RAM) 255. As such, no one need ever know the DES keys. RTC RAM 255 is typically a small capacity RAM and has an external battery 257 for maintaining its contents during power outage.

The RSA engine 260 is a special purpose arithmetic unit designed and structured to perform fast modular exponentiation. In the specific embodiment, it performs 10 exponentiations per second on a 1024 bit value. Its design and operation will be understood by one of skill in the art. If another encryption method besides RSA public key cryptography is provided by the system, other types of arithmetic units may be provided along with or instead of RSA engine 260.

In operation, the cryptographic system 100 (FIG. 1) will receive an encryption request or a decryption request from the host (not shown) via messages that connects the system to the host. The encryption request will include the message data to be encrypted and, perhaps, the encryption keys. Alternatively, the encryption keys may be kept in RAM 126 (FIG. 1) or RAM 230 (FIG. 2) of the cryptographic processor 110. The decryption request will include the ciphertext and the decryption keys. The request and any accompanying keys, are passed to cryptographic processor 110 of one of the processing boards 107 by the host interface 105.

For public key RSA, the CPU 210 of the cryptographic processor 110 receiving the request will construct exponentiation tasks for execution by RSA engine 260 from the message data and the keys. RSA engine 260 performs exponentiations and returns the results to CPU 210. As described above, the encryption and decryption may be broken into one or more exponentiation tasks. These tasks can be performed in parallel to speed up the operation. The individual results of the exponentiation tasks are combined using the principles of the Chinese Remainder Theorem by CPU 210 to form the result—as described in the aforementioned patent application Ser. No. 08/085,993, which was previously incorporated by reference.

To speed up performance of the exponentiation tasks, the work may be offloaded on secure bus 120 to cryptographic coprocessor 115. Typically, cryptographic coprocessor 115 is a specialized processor capable of performing multiple exponentiations or other cryptographic calculations at a greater rate. More details regarding cryptographic coprocessor 115 will be given with respect to FIG. 3 below.

The hashing engine 270 is provided as part of the cryptographic processor 110 to calculate an expected hash value for a message provided to it. The expected hash value is generally a checksum value used to verify that the message has not been altered. Other hash values, and accordingly other expected hash values, are possible without departing from the spirit of the invention. If the expected hash value matches a hash value that was generated earlier and appended to the message, then a degree of confidence is gained in the validity of the message. The amount of confidence is based upon the hash algorithm used. In the specific embodiment, hash engine 270 performs a FIPS 180-1 compliant Secure Hash Algorithm (SHA-1.) SHA-1 produces a 160-bit hash value.

Hash values are appended to messages sent over secure bus 120. If the message changes en route, the hash value that is attached to the data will not match the expected hash value computed for the message at the other end.

Physical security circuits 280 are incorporated in cryptographic processor 110 to monitor the battery level and the VCC level. The physical security circuits 280 operate to detect voltage levels which tend to indicate that the chip is possibly being tampered with and provide an alarm to CPU 210. The physical security circuits 280 include VROM 282.

VROM 282 is a physically secure, non-volatile memory that is one-time programmable. As mentioned above, it is programmed by the manufacturer with the seed for generating DES keys, as well as with the public key of an RSA public/private key pair and an ICF flag (ICF stands for International Cryptography Framework). The RSA public key is in this embodiment the RSA public key given by the manufacturer (akin to certificate authority) to allow authentication, as will be later explained in conjunction with FIG. 4. It is emphasized that although the seed for generating the DES keys is securely located in the VROM 282, for further security the DES keys can be generated from the additional seeds at the RTC RAM 255 and VROM 240 (as shown in FIG. 4, e.g., steps 406, 416 & 655).

Figure 3:
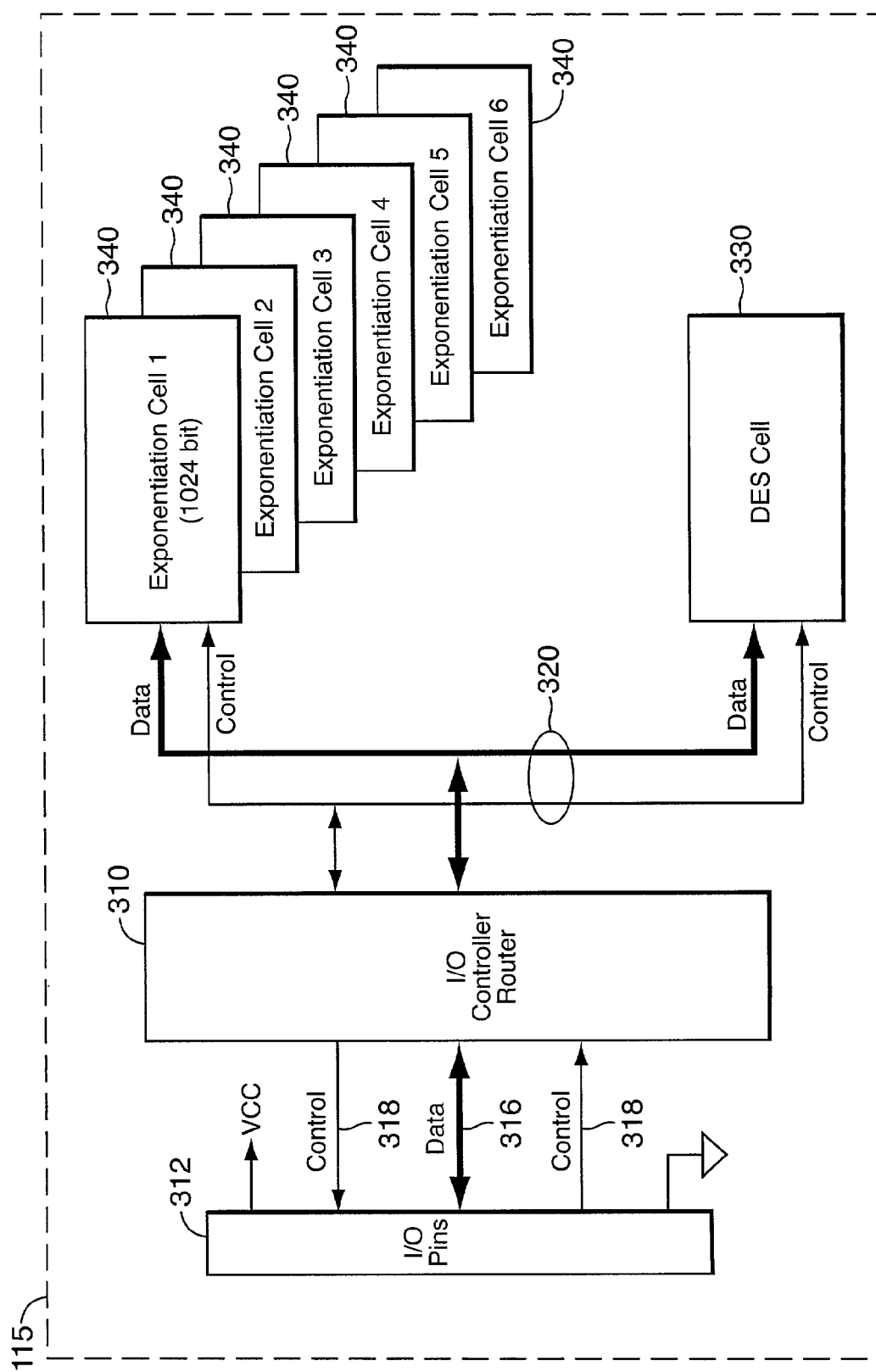
FIG. 3 illustrates, in block diagram form, the cryptographic coprocessor.

FIG. 3 depicts a more detailed block diagram of cryptographic coprocessor 115. Data is communicated between cryptographic coprocessor 115 and secure bus 120 through I/O pins 312 which connect to an I/O controller router 310 by a data bus 316 and a control bus 318. As described herein, cryptographic co-processors 115 are each on a separate VLSI components. However, if it resided on the same component as cryptographic processor 110, I/O pins 312 would not be necessary. In the specific embodiment, data bus 316 is a 32-bits wide data bus. One of the signals on control bus 318 may be a device select signal. The device select signal is decoded from an address range that is assigned to a particular cryptographic coprocessor 115. This may be any range addressable by the addressing bandwidth of CPU 210. As mentioned above, cryptographic processor 110 may include device select decoder 244 (FIG. 2) for providing the device select signal. When an address in the defined range is referenced, the device select signal is asserted for the particular cryptographic coprocessor 115.

As FIG. 3 further shows, the I/O controller router 310 of the cryptographic co-processor 115 is coupled by a data/control bus 320 to a DES cell 330 and a number of exponentiation cells 340. The DES cell 330 operates as a companion to the DES engine 250 of the cryptographic processor 110 (FIG. 2). In fact, it is designed in much the same way as the DES engine 250 to decrypt data received from the secure bus 120, and to encrypt data to be communicated to the cryptographic processor 110. The exponentiation cells 340 are substantially identical to one another, and are special purpose arithmetic units designed and structured to do fast exponentiation. In the specific embodiment, cryptographic co-processor 115 includes six exponentiation cells 340, although this number may be greater or fewer depending on the needs of the user and the capabilities of the technology. The specific embodiment of cryptographic processor 110 allows the attachment of up to eight cryptographic co-processors 115 to a single cryptographic processor 110.

In operation, a cryptographic coprocessor 115 receives tasks from the cryptographic processor 110 (i.e., the CPU 210) and returns results of such tasks. Data received by I/O controller router 310 is generally encrypted. If so, it is sent to the DES cell 330 for decryption before being routed to an available exponentiation cell 340. The exponentiation cell performs the exponentiation, and the results are encrypted by DES cell 330 and sent back to cryptographic processor 110. Typically, the exponentiation calculations will take much more time than the DES encryption/decryption. Therefore, having only one engine encryption/decryption (i.e., DES cell 330) does not generally cause a bottleneck to the throughput. However, if needed, multiple DES cells 330 may be provided.

FIG. 4 is a flow diagram illustrating the initialization (start-up) procedure 400 upon reset and operation of the cryptographic system 100. The flow diagram illustrates the process, in this embodiment, of placing and operating the cryptographic system 100 in a secure state or a normal state. Typically, the method is implemented as a series of software instructions that reside in a system memory, i.e., VROM 240 (FIG. 2). Whatever memory is used to contain the process that implements a method as in FIG. 4, it should be a secure memory so that it cannot be altered after its manufacture. VROM 240 is an example of such a secure memory. At the time of manufacture, software instructions including the red-boot program instructions are hardwired into VROM 240. The contents may not be externally probed or altered without destruction, nor can the VROM 240 be read by external (to the cryptographic processor 110) sources. The MMU of the CPU 210 operates to isolate and shield the data bus 215, and thereby the content of VROM 240, from surreptitious access.

The software including the red-boot program instructions is executed by a processor such as CPU 210. CPU 210 is constructed or otherwise configured so that the software in VROM 240 is automatically executed after a system reset before any other software. A purpose of this feature is to allow placing the system in a secure state and to allow operations in a secure environment (such a secure loads of proper user programs). This ensures that the end-user knows which program is executing, and that the system is properly secured before any sensitive data is allowed to be brought into the system.

VROM 240 provides physical barriers for protecting valuable memory contents such as the program instructions and secret cryptographic keys. The red-boot program in the VROM 240 operates to prepare the secure environment. In essence, the red-boot program implements/enforces a number of principle including: 1) the randomly generated DES keys protect program instructions and data variables that are external to the cryptographic processor; 2) secure program instructions are cryptographically signed by a private key before being accepted for cryptographic processor execution by the red-boot program; and 3) non secure program instructions are accepted for cryptographic processor execution only after all the DES keys have been zeroed by the red-boot program; and secure program instructions are replaced via the red-boot only after the DES keys have been zeroed.

For example, the red-boot program can securely load a program that can perform DES encryption and would require a personal signature or identification match before accepting DES keys and encryption requests. In another example, a black-boot program is securely loaded via the red-boot program (once authenticated, the red-boot program transfers control to the black-boot program). The black-boot program is then used for loading command/response type application programs. The black-boot program may require programs to be signed by a private key that is different than the private key by which the red-boot programs required application programs to be signed. Indeed there can be multiple black-boot programs, each requiring a different private key for signing an application program. In the preferred embodiment, the DES keys are not saved while power is off. The DES keys are re-generated at start-up time as a function of one or more, preferably all, of the seeds in the VROM 282, RTC RAM 255 and VROM 240. Attacking the seeds requires attack on all three memories. Hence, spreading the seeds in this way spreads the risk of attack.

If the black-boot program concept is used, the above-mentioned third principle that the red-boot program enforces will be replaced by principle 3" enforced via the black-boot program. Namely, there is a need to prevent application programs from gain knowledge of prior secret applications (instructions and/or data). Thus, the principle implemented/enforced by the black-boot program is: 3") secure program instructions are replaced by the black-boot program only after the DES keys are zeroed. The black-boot program would not replace itself. It would replace only the command/response application. Moreover, public/private key pair required by the red-boot program will not be changed. This means that the very first program (black-boot) must be signed by the fixed private key (required by the red-boot program). However, the public/private key pair required by the black-boot program can be updated as often as desired. Thus, a hierarchical trust relationship is formed.

At the top of this hierarchy, the red-boot program assumes control upon reset. The red-boot program can then load a black-boot program and transfer control (ownership) to such black-boot program. The red-boot program will do so only if the black-boot program has been signed by the private key required by the red-boot program (e.g., key originally required by the manufacturer similar to a key provided by a certificate authority). In other words, the manufacturer signs the black-boot program with a private key the counterpart public key of which is incorporated into the red-boot program. The public key can then be used to verify that the black-boot program was indeed signed by the manufacturer (with the private key). If so, control is transferred from the red-boot program to the black-boot program. This allows the manufacturer to use the 'fixed' red-boot program to be used for securely loading black-boot programs while maintaining ownership of the secure process by the manufacturer (with knowledge of the keys).

Each one of the black-boot programs can, in turn, load a user program but only if the user program is signed by the private key as required by the black-bot program. This time the private key component (the signing private key) is maintained externally where the application is generated (at the user or user application vendor). The public key component, the public key, is provided by the application user or vendor to the manufacturer and is incorporated into the black boot program code as will be further explained below. This allows user applications creator-vendor, with exclusive knowledge of it private key, to distribute its user applications securely, even over public networks. Hence, ownership of the secure process of loading and executing user applications goes to the user applications creator-vendor. Variations to the above-described process and operation are possible without departing from the scope and spirit of the invention, as will be shown in conjunction with FIG. 4. Whatever the case may be, as exemplified above the concept of "ownership" of a secure process is important. A cryptographic processor without a secure program is owned by the manufacturer that knows the private key needed for loading the initial secure program. A cryptographic processor with a secure program is owned first by the manufacturer. As mentioned above and will be further explained below, the ownership of the secure process can be relinquished and transferred from the manufacturer to another party, e.g., the end user or user application vendor.

To that end, the cryptographic system undergoes an initialization process that establishes its ability to provide the desired secure environment. As noted before, upon reset, the red-boot program is executed by the CPU 210 in the cryptographic processor. The boot-up sequence (or initialization) goes as follows:

```
mfr.owner      mfr.sig.OK?    -->cust.owner    cust.Sig.OK?
red-boot (ROM):    ---> black-boot (RAM)      ---> application
```

Referring now to FIG. 4 for the foregoing procedure as implemented in one embodiment of the invention. At step 402, a cryptographic system reset occurs because of system power-up or other system reset. In this step, CPU 210 performs a self-test on the system and initializes all of the volatile registers to known values. Then, in step 404, CPU 210 examines its registers to determine if it is in a secure state or an unsecure state. Initially, the system will be in an unsecure state. Only a system that was in a secure state before being powered-off or reset will be initiated to the previous secure state upon reset.

If in step 404, CPU 210 determines that it is in a secure state (using a flag in the red-boot program), in step 406 it generates its DES keys from seed values found in RTC RAM 255, VROM 282, and VROM 240. As mentioned, these keys are stored in a volatile RAM, so they must be re-generated each time the system is initialized. After generating the keys, CPU 210 proceeds to step 410 in which it loads a black-boot program from flash memory. More details of step 410 will be given below.

If CPU 210 finds that it is not in a secure state, it proceeds to step 412 in which it waits for a command from the host (not shown.) Some time later, since CPU does not have a program to execute, the host issues a command to load a program. CPU examines the command, and it determines whether the command is to load a secure program (e.g., black boot) or a normal (i.e., non-secure) program. The process for executing non-secure programs is illustrated below with respect to steps 650–685.

In order to load a secure program, the system must be put into the secure state. In step 416, the cryptographic keys are generated from RTC RAM 255, VROM 284, and the VROM 240 as in step 406. Then, in step 420, the host loads a program file 510 (FIG. 5) to the cryptographic system 100. In step 420, the program file 510 is a black-boot program (itself designed to securely load a program) from the flash memory 124). The black-boot program file is encrypted inside an encrypted program packet 500 (FIG. 5) because it comes from the host outside the secure portion of the cryptographic processor 110. The encrypted program packet 500, in addition to being encrypted, preferably includes other protection to ensure its authenticity.

In step 424, the encrypted program packet is decrypted and verified for authenticity. In the specific embodiment, the decryption is accomplished by DES engine 250. The decrypted result, a program packet that includes the black-boot program file and additional header and trailer information, is preferably subjected to further checks before loading the black-boot program into the CPU memory. These checks are done using the header and trailer information in order to establish that the black-boot program is the proper program (uncorrupted, authorized etc.).

Figure 5:
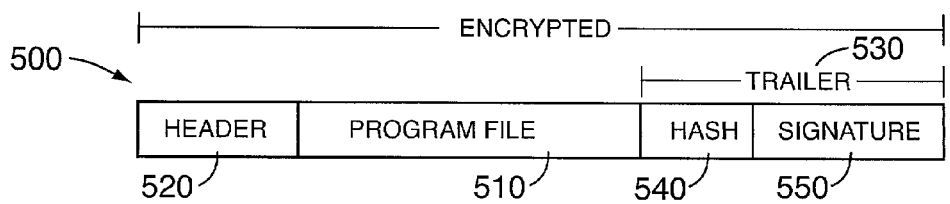
FIG. 5 shows a possible structure of a ciphertext program packet.

Digressing for the moment, FIG. 5 depicts an example of a format for the encrypted program packet. Preferably, the encrypted form of the program packet is triple-DES encoded using CBC mode. As FIG. 5 shows, the encrypted program packet 500 contains a program file 510 (for execution by CPU 210) preceded by a header 520 and followed by a trailer 530. The header 520 contains information about the program packet 500 such as the length of the program file and its starting address. The trailer 530 contains additional security information such as a hash value 540 and a digital signature 550.

Returning to step 424 of FIG. 4, after the program packet 500 is decrypted by the DES engine 250, it is then examined to determine that the decrypted black-boot program file has a valid program length and starting address as specified by the (also decrypted) information of the header 520. Finding that the format is correct provides a level of confidence that the decryption was properly performed, and/or that the decrypted black-boot program file was the one properly retrieved from the host, i.e., that there has not been clandestine attempt to introduce a fraudulent program file that could operate to extract confidential information from the cryptographic processor 110.

If the program packet format is not what is expected, the system will exit step 424 in favor of an abort mode at step 427. Here, to protect itself from unwanted intrusion, the cryptographic system 100 will erase (or zero) all cryptographic keys (i.e., the keys in RTC RAM 255) in step 427, and the cryptographic system 100 is then placed in a non-functioning state. It remains in this state, until the cryptographic system 100 is reset. Since the initialization program did not complete, nothing about the system can be assumed to be secure, so secret data should not be allowed.

If the packet format is determined to be correct, however, hash value 540, a checksum developed from the original (plaintext) form of the black-boot program file 510 is checked against that developed by the hash engine 270 after decryption. If a hash of the program file matches hash value 540, then a level of confidence that the black-boot program file has not changed may be inferred.

If, however, the hash values do not match, the initialization is aborted by exiting to step 427 to erase the cryptographic keys, as described above. Cryptographic processor 110 is then moved into the non-functioning state.

A match of hash values moves the initialization procedure to its final check where it checks digital signature 550. Digital signature 550 is created by encrypting the hash value with a private key of an RSA public/private pair. The hash value 540, developed from the program file before it is encrypted and stored in flash memory 124, is itself encrypted by the RSA scheme. The hash is encrypted (signed) using the private key of the pair and is then added to the trailer 530 of the program packet as the signature 550. In the case of the black-boot program, the manufacturer signs it with its own private key. The VROM 282 is programmed with the public key of the pair when the cryptographic system is manufactured (only the manufacturer maintains the private key component). When the program packet is decrypted, and a hash value is produced from the decrypted version of the program file 510, the accompanying signature 550 is then decrypted using the public key retrieved from the VROM 282. The decrypted result of the hash value is then compared to the created hash value. A match provides further confidence that the program packet 500, and in particular the program file 510 it contains, was indeed the intended program (black-boot) and signed by the intended source (the manufacturer).

If, however, the digital signature is incorrect, i.e., there is no match between the hash value created by the hash engine 270 and the hash that results from the RSA decryption of the signature 550, the initialization is aborted. The process proceeds to the key erasure step 427, and the cryptographic system 100 is placed in the non-functioning state 462.

Recognizing that spurious errors may occur during transmission or checking of the encrypted program packet 500, the system does not abort immediately upon detecting an error. In the specific embodiment, rather than aborting to the non-functioning state immediately upon detection of a anomaly in the checking scheme, CPU 210 makes three attempts to authenticate the program before aborting to step 427.

If the checks performed at step 424 show that the encrypted program file 510 is authentic, the black-boot program file 510 is assumed to be correct, and is then written to the RAM 230. In step 430, the keys are zeroed (or erased) and the state is set to the secure state. Then in step 435, control of the CPU 210 (and thereby the cryptographic system 100) is transferred to now RAM-based Secure_Load program 510.

Although the black-boot program may be changed from time to time, this method provides a level of confidence that the black-boot program file 510 has not been altered or replaced by a fraudulent program. This allows a great amount of flexibility, while still providing security. Furthermore, maintenance updates and black-boot program enhancements may be made by simply changing the black-boot program that is downloaded from the host.

Digressing for the moment to further describe the black-boot program, particularly as it relates to this embodiment. As mentioned above, each black-boot program can require an application to be signed by a particular private key that is unique to that black-boot program. In this case, the black-boot program is a program that may be customized for the user of the cryptographic system (typically the program creator or vendor). Namely, the black-boot program may be configured to require a user-specific or user-customized RSA private key for signing user applications associated with the particular user of the cryptographic system.

If it is properly signed, any program may be loaded. Also, since the program is signed by the private key, but may be verified by the public key, the private key does not need to be stored anywhere on the system (it is maintained externally only by it owner).

To this end, the end-user of the cryptographic system (e.g., user-application program creator, vendor or user) provides the personalized (user-customized) RSA keys and sets other options in a key/option table. These keys are unknown to anyone else. The manufacturer or vendor of the cryptographic system creates the black-boot program with an empty key/option table. That black-boot program is provided to the end-user in object form (without header, hash, signature, hash of the key/option table, and the key/option table itself). The end-user generates the key/option table so that the table contains the end-user's customized information including the public key corresponding to the end-user's private key. Notably, only the end-user knows that private key, and the manufacturer (akin to certificate authority) relinquishes ownership of the secure process when the end-user' private key is used.

Then, the end-user delivers a hash of the key/option table to the manufacturer. The manufacturer concatenates the hash to the black-boot image, hashes and signs the resulting image with the private key corresponding to the public key stored in the VROM 282 (i.e., the manufacturer's private key). The signature (combined with the header, hash, signature, hash of the key/option table, and the key option table itself) is returned to the end-user. Then, the black-boot program is downloaded into the flash memory 124 of cryptographic system 100 from the host in encrypted form, in the format shown in FIG. 5.

The black-boot program's main function is to load other user-application programs into flash memory 124, or to start an application from flash memory 124 (if it is already there). These user-application programs may be anything the end-user may want to securely distribute, load or run. These user-application programs are encrypted using the format shown in FIG. 5 and are signed by the end-user using its private RSA key corresponding to its public RSA key in the key/option table. Since the RSA private key is unknown to anyone other than the end-user, including the manufacturer of the cryptographic system, the end-user can distribute, load and run any program and ensure privacy, i.e., ensure ownership of the end-user over the secure process.

Referring again to FIG. 4, in step 440, once the black-boot program is loaded, CPU 210 determines if the black-boot is authentic using the same technique described above in step 424. If it is not authentic, then operation is aborted to step 427 and the keys are zeroed (erased) and the cryptographic system 100 is placed in a non-functioning state awaiting a reset. If it is authentic, then the black-boot program is loaded into RAM, and control of CPU 210 is transferred to the black-boot program.

Figure 6:
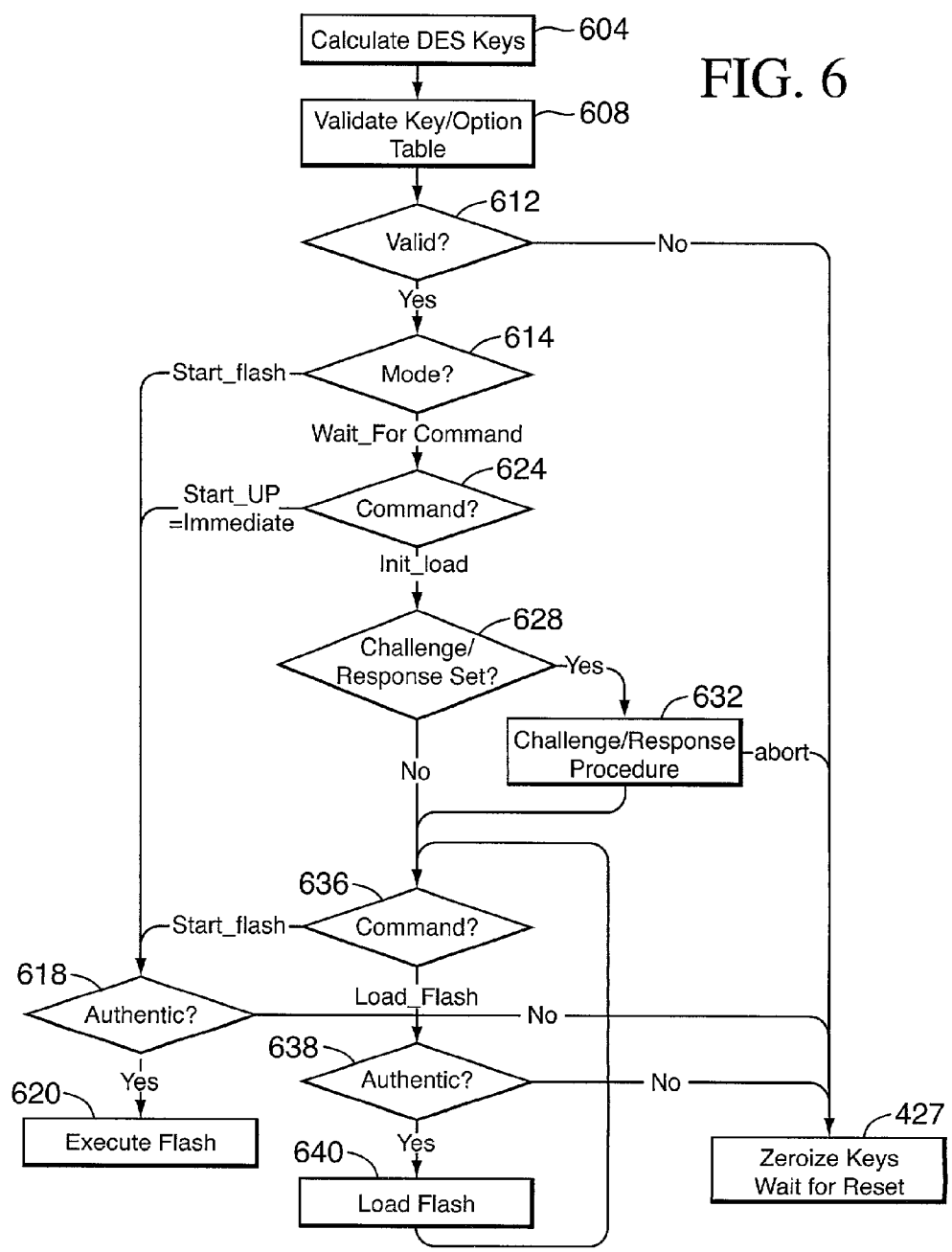
FIG. 6 is a flow diagram of a loader program (e.g. black-boot) that may be used to load user applications.

FIG. 6 illustrates in flow diagram format, an exemplary black-boot program 600. In step 604, black-boot program 600 calculates new DES keys from RTC RAM 255, VROM 282, and VROM 240, since these were zeroed during step 430. Using these DES keys, data may be transferred over the secure bus 120. User-applications, when stored in flash memory 124 are DES encrypted according to the format shown in FIG. 5.

In step 608, black-boot program validates the key/option table (including by validating the signature of the key/option table as described above). In step 612, if the key/option table is valid, then the execution continues with step 614. If not, then the execution is aborted to step 427, the keys are zeroed and the cryptographic system 100 enters a non-functioning state, waiting for a chip reset.

In step 614, a decision is made on what mode the cryptographic system is operating in. The black-boot program 600 has two modes, start_up_immediate and wait_for_command. If the system is in start_up_immediate mode, then at this point the black-boot program 600 branches to step 618. In step 618, the program in flash memory 124 is authenticated using the procedure described for step 424. Notably, the RSA public key required by the black-boot program for authenticating the program is the counterpart of the RSA private key owned and known only by the end-user of the cryptographic system. If this authentication (step 618) fails three times, the DES keys are erased and the cryptographic system 100 is placed in non-functioning mode. Conversely, if the user-application program is authenticated, control of CPU 210 is transferred to the user-application program.

If the system is in wait_for_command mode, the black-boot program 500 branches to step 624 and it stays in that step until a command is issued. The commands that may be issued are init_load (initialize the system to load a program into flash memory 124), start_flash (execute the program in flash memory 124), and load_flash (load the program into flash memory 124). If the command is start_flash, the black-boot program 500 branches to step 618 and 620 to authenticate and execute the program in flash memory 124 as described above. Otherwise, an init_load command is issued.

The black-boot program provides additional security protection in verifying that the host in question is authorized to receive the distributed program (particularly useful when user-programs or updates of such programs are distributed on a public network). To that end, upon receipt of the init_load command, the black-boot program 500 checks the key/option table for the value of a challenge/response bit in step 628. If it is set, then a challenge response procedure is executed in step 632.

The challenge/response procedure involves host communication to determine that the host is authorized to load the application into flash. The black-boot program 600 generates a random number known as ChallengeID. ChallengeID is hashed and sent to the host, which attaches its own hashed random number and digitally signs them both using a private key, corresponding to a public key in the key/options table. These are sent back to the CPU 210, which decrypts them with the private key.

If the challenge response procedure fails, the black-boot program 500 is aborted to step 427, the keys are zeroed (erased) and the cryptographic system is placed in a non-functioning state. Otherwise, the black-boot program 500 branches to step 636, where it waits for a command. If the command is a load_flash command, then the program is authenticated in step 638. If it fails, the program aborts to step 427, and if it succeeds then the user-application program is stored, in the DES encrypted format of FIG. 5, in flash memory 124. If it is a start_flash command, then the program in flash is executed, after authentication.

The following is pseudocode that is appropriate for use as black-boot program 500.

```
bb_start:
    Send "abb initializing" status to the host
    calculate the DES_KEY from seeds
    validate KOT_hash
    if KOT_hash is invalid
        /*This a fatal error*/
        clear all RTC RAM
        Send "abb_kot_hash_failed" status to the host
        wait for reset
    END /*KOT hash not verified*/
```

```
IF STARTUP is set to start Flash image
    /*We drop here if START_UP option is set to immediate mode*/
    start_flash( ) /*There will be not return*/
    /*The START_UP option is set to command mode*/
    IF WAIT_FOR_COMMAND suboption is set
        main_loop:
            wait_for_command ( ):
```

```
            IF received START_FLASH command
            /*The host has to feed the correct sequence of
            INIT_LOAD, LOAD_FLASHs or rely on the image to be in
Flash */
                Send "abb_starting_flash"
                start_from_flash ( )
            END
            IF received INIT_LOAD command
                IF CHALLENGE_RESPONSE is not set
                reset errcode
                else errcode = challenge_response ( )
                IF (errcode)
                    clear application area in RTC RAM
                    goto main_loop
                END
                /*The application is authorized to load Flash*/
                Send "abb_proceed_load" to the host
                DO FOREVER
                    wait_for_command ( )
                    /*The host is responsible to issue START_FLASH and
                    LOAD FLASH* /
                    /*in correct order*/
                    IF received START_FLASH
                        start_flash ( )
                    IF received LOAD_FLASH
                        /*All addresses, sizes and other parameters are in the
                        mailbox/* load_block ( )
                    END /*Do FOREVER*/
            END
END
    /*The command was not recognized (it was none of
START_FLASH, INIT_LOAD*/ goto main_loop
END
```

```
/*We drop here if START-UP option isn't set*/
start_flash( ) /*There will be no return */
procedure start_flash:
        check hash and signature
        IF any of these didn't check up to 3 times
            erase application area in RTC RAM
            send "abb_eflash" status to the host
            goto main_loop
        END
        extract entry_point out of the application header
        IF APPLICATION_NAME option did not pass validation
            Send "abb_ename" to host erase application area in
        RTC RAM
            goto main_loop
        END
        /*Here we actually start the secure application*/
        transfer control to the entry point
END start_flash
procedure load_flash
        Send "abb_loading" to the host
        read and validate load parameters, translate addresses if
        needed
        unenvelope the RAM block using ENVELOPING option
        encrypt the data with the precomputed DEC key
        transfer the encrypted block to Flash
```

Challenge/Response Procedure

```
        Message = (RandFill || ChallengeID)
        Hash = SHA1 (Message)
        Signature = RSApriv(Hash)
        Response = Message || Signature
    compute ChallengeID
    send ChallengeID (challenge) to the host
    receive the response and verify all fields
    IF error
```

-continued

```
        return E_MSG
IF response . ChallengeID ! =ChallengeID
        return E_ID
calculate hash of (RandFill ChallengeID) from response
verify signature of the hash
IF verification_error
        return E_SGN
ELSE
        return E_OK
```

It can easily be envisioned that using the principles of this invention, application programs may be distributed in a variety of ways while maintaining a level of security. For example, files may be sent over networks, such as the Internet, where there is great opportunity for mischief, but the sender and receiver can have a great deal of confidence that the program that ends up running on the system has not been altered or replaced. Furthermore, a seller of software for secure systems may ensure that all systems running its software are authorized users.

Referring again to step 412, if the program to be executed is a normal program, then in step 450, CPU 210 examines the International Cryptography Framework (ICF) flag in the VROM 282. The ICF flag is set at the manufacturer, and is put in place to meet certain governmental regulations about exporting cryptographic systems.

As a note, the International Cryptography Framework, is essentially intended to allow export of products with strong cryptography, as long as a "key recovery" capability is built in. That means that the strong cryptographic keys can be exported but can't be used unless the government has the ability to break in when it needs to by going through a trusted third party that has a master key. Users of the technology for domestic transmissions would not have to submit their communications to key recovery.

If the ICF flag is set, then no program is allowed to run that is not digitally signed, even in normal mode. This prevents unauthorized programs from running, as the U.S. Government will not allow export of certain cryptographic techniques. If the ICF flag is not set, then any program may be run, even if it is not digitally signed, in normal mode.

If the ICF flag is set, then the program must be authenticated just as it is in the secure mode. Steps 655–665 are similar to steps 416 through 424 described above. However, the program file may be any program that has been properly authenticated. If it is authenticated, then in step 470, control of CPU 210 is transferred to the program. If it is not authenticated, then the keys are zeroized and the cryptographic system enters a non-functional state in step 427.

If the ICF flag is not set, then the system simply loads default keys in step 475 and loads a program from the host in step 480. The program is checked to ensure that it is correct, but no digital signature is provided. If it is correct, then it is executed in step 470, and if not then the program aborts to step 427 as described above.

Although specific embodiments of the present invention have been included herein, these are given by way of example only. The invention is not limited, except by the attached claims. One of skill in the art can readily envision variations and alternatives to the cited examples that do not depart from the spirit of the present invention. Such variations and alternatives are anticipated by this invention.

The invention claimed is:

1. A cryptographic system enabling ownership of a secure process that includes one or more of secure distributing, loading and running of programs, comprising:
    a memory having capacity for holding an imported program; and
    a cryptographic processor configured to hold securely one or more seed values, the cryptographic processor including
        a physical security circuit configured to hold one of the seed values and a public key,
        a read only memory configured to hold a second one of the seed values and a program to be used by the cryptographic system for authenticating the imported program, and
        a random access memory configured to hold a third one of the seed values and a cryptographic key created from the seed values,
    wherein the cryptographic key is used by the cryptographic processor for decrypting the imported program, and wherein the public key is used by the cryptographic processor for authenticating the imported program.

2. A cryptographic system as in claim 1, wherein the public key corresponds to a private key that is known only to a provider of the imported program so that the provider can establish ownership of secure distribution, loading and execution of the imported program by signing the imported program with the private key.

3. A cryptographic system as in claim 1, further comprising:
    a secure bus linking the memory and cryptographic processor.

4. A cryptographic system as in claim 1, wherein the cryptographic processor further includes
    a hashing engine configured for generating an expected hash of the imported program to be used in authenticating the imported program.

5. A cryptographic system as in claim 1, wherein the physical security circuit is maintained by a buttery.

6. A cryptographic system as in claim 1, wherein the cryptographic processor further includes
    a processing unit capable of executing the program, and
    an internal secure bus operatively linking the processing unit to the hashing engine, the physical security circuit, the read only memory and the random access memory.

7. A cryptographic system as in claim 1, wherein the read only memory is configured to further hold a flag, the flag being used in determining whether there is a International Cryptography Framework restriction associated with the cryptographic system.

8. A cryptographic system as in claim 1, further comprising:
    cryptographic co-processors capable of operating in parallel for handling cryptographic tasks provided by the cryptographic processor.

9. A cryptographic system as in claim 1, wherein the cryptographic processor further includes
    a decryption/encryption engine capable of using the keys for decrypting/encrypting the imported program.

10. A cryptographic system as in claim 1, wherein the cryptographic processor further includes
    a public/private key cryptography engine capable of using the public key for decrypting a signature associated with the imported program and the private key.

11. A cryptographic system as in claim 1, wherein the program is a red-boot program executed each time the cryptographic system is powered off or reset.

12. A method, performed by a cryptographic system in a computer system, for enabling ownership of a secure process that includes one or more of secure distribution, loading and running of programs, comprising:

generating a cryptographic key from seed values held securely by the cryptographic processor;

decrypting, using the cryptographic key, a packet that includes an imported program, a hash and a signature in encrypted form; and authenticating the imported program each time before it is to be loaded into or executed by the computer system, using also a public key to decrypt the signature and verify it against the hash value produced from the packet decryption, the signature resulting from previously signing the hash by a private key that corresponds to the public key and is known only to the provider of the imported program in order to maintain ownership over its distribution, loading and execution, wherein the cryptographic processor executes a red-boot program for performing these steps each time it is powered-off or reset, the red-boot program requiring the public key for authenticating each imported program, the red-boot program transferring control to the imported program only if the imported program is successfully authenticated.

13. The method of claim 12, wherein the imported program is a black-boot program that is configured to perform these steps except that the black-boot program requires that the public key be a customized public key for authenticating each subsequently imported program associated with a user and the private key corresponding to the customized public key is a user-maintained private key, so that upon authenticating any of the subsequently imported program the user can take over ownership of the secure process from a provider of the cryptographic processor.

14. A method comprising:

each time a cryptographic system having a secure mode and a non-secure mode is initialized upon power up, if the system is initialized in the secure mode, generating cryptographic keys, including a first cryptographic key, from seed values held securely in the cryptographic system;

loading a first encrypted program packet into the system from an external memory;

decrypting the first encrypted program packet with the first cryptographic key to provide a first program file and a first digital signature;

authenticating the first digital signature prior to each execution of the first program file; and only when the first digital signature is authentic, executing the first program file.

15. The method of claim 14, further comprising:

loading a second encrypted program packet into the system from an external memory;

decrypting the second encrypted program packet to provide a second program file and a second digital signature; and authenticating the second digital signature using a second cryptographic key from the first program file.

16. The method of claim 14, further comprising:

when the first digital signature is not authentic, not executing the first program file, and erasing the first cryptographic key from a volatile memory.

17. The method of claim 14 wherein the encrypted program packet is DES encrypted.

18. The method of claim 14 wherein the encrypted program packet is triple-DES encrypted using a CBC DES algorithm.

19. The method of claim 14 wherein the external memory is a flash memory.

20. The method of claim 14 wherein the decrypting further provides a header and a hash value for the program file.

21. The method of claim 20 wherein the first digital signature is an RSA encryption of the hash value.

22. The method of claim 21 wherein the RSA encryption is accomplished using a private key of a public/private key pair.

23. The method of claim 22 further comprising:

providing a public key of the public/private key pair;

decrypting the first digital signature with the public key to produce a decrypted digital signature value; and determining the program file is not authentic if the decrypted digital signature value is not equal to an expected value.

24. The method of claim 23 wherein the expected value is the hash value.

25. The method of claim 20 wherein the hash value is produced using a FIPS 180-1 standard algorithm.

26. The method of claim 20 further comprising:

calculating an expected hash value for the program file;

comparing the expected hash value with the hash value; and determining the program file is not authentic if the expected hash value does not equal the hash value.

27. The method of claim 20, further comprising:

examining the header;

determining the program file is not authentic if the header is not of an expected format.

28. The method of claim 14 wherein upon initialization the loading, decrypting, authenticating and executing of the first program file are performed before any other executable code is executed.

29. The method of claim 14 wherein the loading, decrypting and authenticating are done each time prior to execution of the first program file.

30. The method of claim 14 wherein the loading of the first encrypted program packet is done each time a system reset occurs.

31. The method of claim 14 wherein upon initialization the loading, decrypting, authenticating and executing of the first program file are performed before any other executable code is executed.

32. The method of claim 14 wherein the loading, decrypting and authenticating are done each time prior to execution of the first program file.

33. The method of claim 14 wherein the loading of the first encrypted program packet is done each time a system reset occurs.

34. A method of initializing a secure system comprising:

loading a first encrypted program packet with a header into a system from an external memory;

each time the cryptographic system is initialized upon power up, if the system is initialized in a secure mode, generating cryptographic keys, including a first cryptographic key from seed values held securely in the system;

decrypting the first encrypted program packet with the first cryptographic key to provide a first program file, a hash value, and a first digital signature;

prior to each execution of the first program file, determining the first program file is not authentic if the header is not of an expected format;

calculating an expected hash value from the first program file;

determining the first program file is not authentic if the expected hash value is not equal to the hash value;

decrypting the digital signature using an RSA public key to produce a decrypted digital signature value; and determining the first program file is not authentic if the decrypted digital signature value does not equal the hash value; and when the program file is not authentic, erasing the first cryptographic key, otherwise, executing the first program file.

35. The method of claim 34 wherein the hash value is produced using a FIPS 180-1 standard algorithm.

36. The method of claim 34 wherein the first program file is triple DES encoded with a CBC DES algorithm.

37. A computer software product including executable code stored on a computer readable storage medium causing a processor to:

load a first encrypted program packet into a cryptographic system from an external memory, the cryptographic system having a secure mode and a non-secure mode;

each time the cryptographic system is initialized upon power up, if the system is initialized in the secure mode, generating cryptographic keys, including a first cryptographic key, from seed values held securely in the cryptographic system;

decrypt the first encrypted program packet with the first cryptographic key to provide a first program file and a first digital signature;

authenticate the first digital signature prior to execution of the first program file; and only when the first digital signature is authentic, execute the first program file.

38. The computer software product of claim 37 wherein the storage medium is a secure non-volatile memory.

39. The computer software product of claim 37 wherein the processor operates the executable code after a system reset before running any other executable code.

40. A cryptographic system comprising:

a memory unit, the memory unit containing encrypted program file with which a hash value in encrypted form is associated;

a cryptographic processor device, the cryptographic processor device including a processor;

an engine capable of using a cryptographic key for decrypting the encrypted program file into a decrypted program file, the cryptographic key being generated from seed values held securely in the cryptographic system each time the cryptographic system is initialized in a secure mode upon power up;

a hashing engine for determining the hash value of the decrypted program file; and a public key cryptography engine for decrypting a digital signature provided with the encrypted program file to produce a decrypted digital signature value that corresponds to the hash value in decrypted form, wherein prior to each execution the processor retrieves from the memory unit the encrypted file in order to obtain therefrom and authenticate the decrypted digital signatures.

41. The cryptographic system of claim 40 wherein the public key encryption engine performs RSA public key encryption using the public key of a public/private key pair for decrypting the digital signature.

42. A secure digital system, comprising:

a processor;

a cryptography unit residing on the same substrate as the processor, the cryptography unit being coupled to the processor by a first data bus, the first data bus being protected from external probing; and a destination unit, the destination unit residing on a different substrate than the processor, the destination unit being coupled to the processor by a second data bus, wherein the processor directs data to the cryptography unit on the first data bus to produce encrypted data using a cryptographic key that is generated from seed values held securely in the secure digital system, wherein the processor directs the encrypted data to the destination unit on the second data bus and wherein the processor retrieves the encrypted data from the destination unit on the second data bus and directs the encrypted data to the cryptography unit to reproduce the data wherein the reproduced data is executed by the processor, but each time before its execution the reproduced data is verified and authenticated.

43. The secure digital system of claim 42, further comprising:

a decryption unit, wherein the processor retrieves the encrypted data from the destination unit on the second data bus, and directs the encrypted data to the decrypting unit to reproduce the data.

44. The secure digital system of claim 43, wherein the encryption unit and the decryption unit are a single unit.

45. The secure digital system of claim 42, wherein the cryptography unit performs DES encryption, and wherein the cryptographic key is a DES key.

46. The secure digital system of claim 42, wherein the destination unit is a memory.

47. The secure digital system of claim 46, wherein the memory is one of the set consisting of random access memory and flash memory.

48. A method as in claim 47 further comprising:

if the original load program is determined to be a normal load file and is authenticated, determining the state of an exporting regulation flag, so that if the exporting regulation flag is set authenticating a program before allowing it to execute, and if the exporting regulation flag is reset allowing the program to execute in normal mode.

49. The secure digital system of claim 42, wherein the destination unit is a co-processing unit.

50. The secure digital system of claim 49, wherein the destination unit includes an encryption/decryption unit for decrypting encrypted data received from the second data bus and for encrypting data sent on the second data bus.

51. A method of operating a cryptographic system in a secure manner, comprising:

loading by a processor in the cryptographic system a first encrypted packet with a first program file;

decrypting the first encrypted packet with a first decryption key created from seed values held securely in the cryptographic system, the decryption creating a decrypted first program file;

authenticating the decrypted first program file using a first authentication key provided in the cryptographic system;

if the first program file is authenticated, executing the first program file to load a second encrypted packet with a second program file containing a key/option table with a second authentication key, wherein the second authentication key can be customized for a user of the cryptographic system so that the second authentication key is known only to that user;

decrypting the second encrypted packet to create a decrypted second program file using a second decryption key generated from the seed values;

before execution of the decrypted second program file, authenticating the decrypted second program file using the second authentication key.

52. A method for enabling ownership of a secure process in a computer system with a cryptographic system, comprising:

decrypting, by the cryptographic system using a cryptographic key created from seed values held securely in the cryptographic system, an encrypted packet with a load program to create an original load program;

authenticating and validating the original load program using a public key of a public/private key pair the private key being maintained and known only to a provider of the cryptographic system; and if the original load program is determined to be a secure load file and is authenticated, placing the cryptographic system in a secure mode, and authenticating a secondary loader program, wherein the secondary loader program can be customized for a user by placing a personalized public key in a table, the personalized public key corresponding to a personalized private key known only to the user, and wherein the secondary loader program is configured, in response to a load command from the cryptographic system, to allow a user program to be loaded and stored in memory if the user program is authenticated, using the personalized public key, the user program being signed by the personalized private key, and in response to a start command from the cryptographic system, to execute the stored user program if it is authenticated.

53. A cryptographic system, comprising:

means for loading a first encrypted packet with a first program file;

means for decrypting the first encrypted packet with a first decryption key created from seed values held securely in the cryptographic system, the decryption creating a decrypted first program file;

means for authenticating the decrypted first program file using a first authenticating key provided in the cryptographic system;

means for causing the first program file, if the first program file is authenticated, to load a second encrypted packet with a second program file containing a key/option table with a second authentication key, wherein the second authentication key can be customized for a user of the cryptographic system so that the second authentication key is known only to that user;

means for decrypting the second encrypted packet with a second decryption key generated from the seed values to create a decrypted second program file; and means for authenticating the decrypted second program file using the second authentication key before execution of the decrypted second program file.

54. A cryptographic system, comprising:

means for decrypting an encrypted packet with a load program to create an original load program;

means for authenticating and validating the original load program using a key provided in the cryptographic system, the key corresponding to a private key known only to a provider of the cryptographic system, the private key being used to sign the load program; and if the original load program is determined to be a secure load file and is authenticated, means for placing the cryptographic system in a secure mode, and means for authenticating a secondary loader program, wherein the secondary loader program can be customized for a user by placing a personalized public key in a table, and wherein the secondary program is configured, in response to a load command from the cryptographic system, to allow a user program to be loaded and stored in memory if the user program is authenticated, the user program being signed by a private key corresponding to the personalized public key that is known only to the user, and in response to a start command from the cryptographic system, to execute the stored user program if it is authenticated via the personalized public key.

55. A cryptographic system as in claim 54 further comprising:

means for determining the state of an exporting regulation flag if the original load program is determined to be a normal load file and is authenticated;

means for authenticating a program before allowing it to execute if the exporting regulation flag is set; and means for allowing the program to execute in normal mode if the exporting regulation flag is reset.

56. A cryptographic system as in claim 54, further comprising:

means for securely holding cryptographic system initialization instructions capable of placing the cryptographic system in a secure mode, the holding means being configured to prevent external probing, surreptitious access or alteration without its destruction, wherein upon power up the cryptographic system will be initialized to the secure mode if before power down the cryptographic system was in the secure mode, and wherein the cryptographic system will be initialized upon power up to a non-secure mode if before power down the cryptographic system was in the non-secure mode.

* * * * *

UNITED STATES PATENT AND TRADEMARK OFFICE
CERTIFICATE OF CORRECTION

| | |
|---|---|
| PATENT NO. | : 7,055,029 B2 |
| APPLICATION NO. | : 09/949323 |
| DATED | : May 30, 2006 |
| INVENTOR(S) | : Thomas Collins et al. |

Page 1 of 1

It is certified that error appears in the above-identified patent and that said Letters Patent is hereby corrected as shown below:

In column 8, line 9, delete "SHA-l" and insert -- SHA-1 --, therefor.

In column 18, line 39, in Claim 5, delete "buttery" and insert -- battery --, therefor.

In column 19, line 36, in Claim 14, delete "method" and insert -- method, --, therefor.

Signed and Sealed this

Twenty-eighth Day of July, 2009

JOHN DOLL
*Acting Director of the United States Patent and Trademark Office*